D S Middlekauff,
Mower.
No. 10652. Patented Mar. 14, 1854
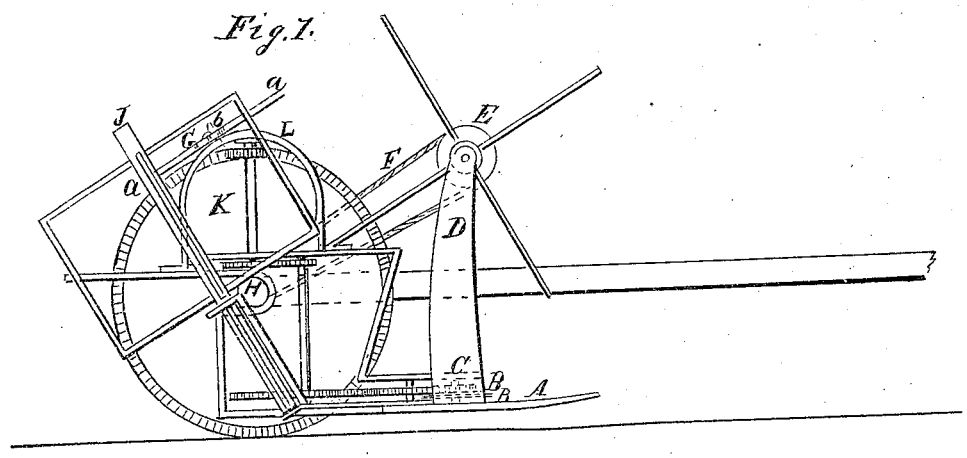
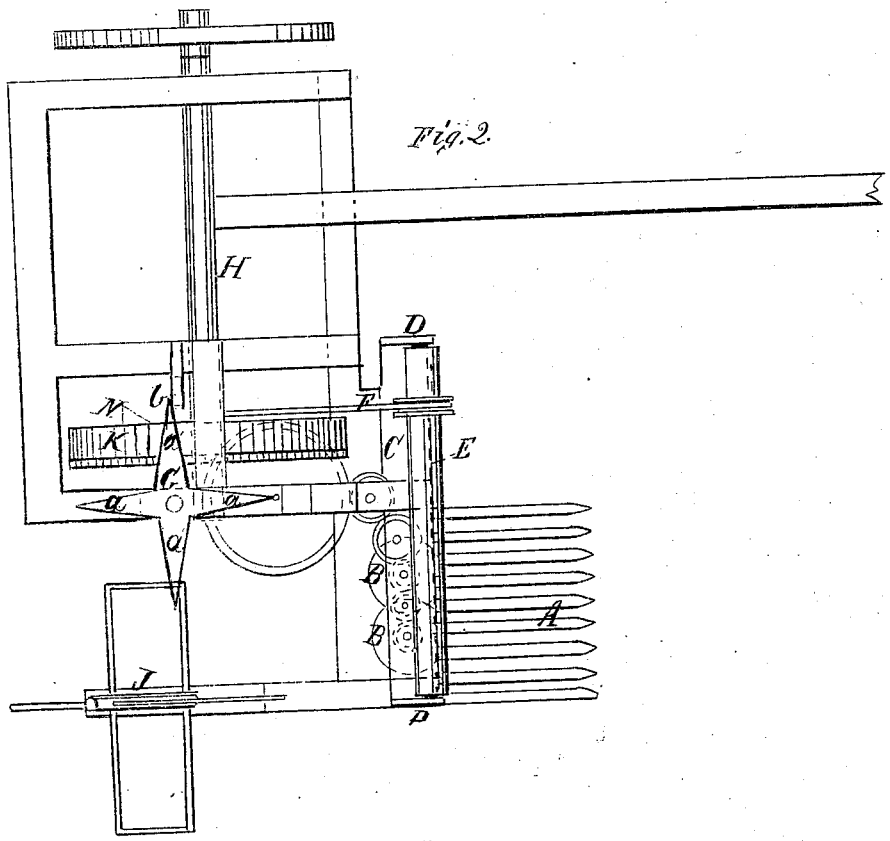

UNITED STATES PATENT OFFICE.

DANIEL S. MIDDLEKAUFF, OF HAGERSTOWN, MARYLAND.

IMPROVEMENT IN GRAIN-HARVESTERS.

Specification forming part of Letters Patent No. 10,652, dated March 14, 1854.

*To all whom it may concern:*

Be it known that I, DANIEL S. MIDDLEKAUFF, of Hagerstown, in the county of Washington and State of Maryland, have invented a new and useful Improvement in Grain-Harvesters; and I do hereby declare that the following is a full, clear, and exact description of the same, reference being had to the accompanying drawings, and to the letters of reference marked thereon, in which—

Figure 1 is an end elevation. Fig. 2 is a plan view.

Like letters of reference refer to like parts in the different figures.

The nature of my invention consists in constructing a machine for the purpose of cutting grain and leaving it in gavels or sheaves suitable for binding.

To enable others skilled in the art to make and use my invention, I will proceed to describe its construction and operation.

I construct guides or forks A, which project a short distance in front of the rotary cutters B B. These forks are intended to stand in a horizontal position and form a protection to the cutters B B, which are placed directly over the forks A, near the point where said forks are attached to the apron or platform K of the machine. Cutters B B may be two or more in number, as the case may require. They are each secured to an axle, with which they revolve. The edges of the cutters must pass each other, as seen in Fig. 2 in dotted lines, for the purpose of forming a cutting-edge the whole distance. It will readily be seen that if the cutters do not pass each other, as described, there will be a space between the cutters that will not cut the grain. These cutters are operated by a series of pinions, which are attached to the same axles that the cutters are attached to. Said axles are secured in bearings which are formed in the apron K and cross-bar C, and they secure a rotary motion from the main or driving wheel R.

D D are bearings for the purpose of supporting the reel E. Said reel is operated by means of the main axle of the machine by means of a belt, F, which passes around said axle and over a pulley on the axle of the reel E.

G is a reel made with four arms, $a\ a\ a'\ a'$, and is secured to a bow or frame, L, which is constructed for that purpose. Said reel is placed in an inclined position, as seen in the drawings, Fig. 1, and is free to move in either direction.

$b$ is a spring-catch, which is attached to the stationary frame-work of the machine, and serves to catch and hold the reel G so that it cannot turn. This spring-catch is operated by means of a projection, N, which is secured to the inner face of the wheel K, and at every revolution of the wheel said projection forces the spring out far enough to let the end of the arm of reel G pass.

J is another reel, which is provided with four arms, and is made as seen in the drawings, and it is also secured in an inclined position, and is supported by means of suitable bearings, as seen in Fig. 1.

The operation of my machine is as follows: The rotary cutters are forced against the standing grain while in motion, and the reel E serves to draw the grain against the cutters, which cut the grain off. Then said grain passes off to the rear of the cutters, where it remains standing on the apron K in an inclined position. The upper ends of the grain rest against the arms of the reels G and J until the projection N comes in contact with the spring-catch $b$ and forces it out, so that the end of the arm $a'$ of reel G can pass. Then the weight of the grain on the arms of the reels G and J immediately forces said reels around, which allows the grain to pass between them and fall to the ground in a gavel suitable for binding. As soon as the projection N has passed the spring-catch, said catch flies back in time to catch the next arm of reel G. The arms of reel J are supported by means of the reel G, against which they rest while the machine is in operation.

What I claim as my invention, and desire to secure by Letters Patent, is—

The rotary knives or cutters B B, the edges of which pass by each other for the purpose of forming a continuous edge for the purpose of cutting the grain.

DANIEL S. MIDDLEKAUFF. [L. S.]

Witnesses:
JOS. C. COXSON,
JNO. COOK.